Patented Jan. 22, 1929.

1,699,596

UNITED STATES PATENT OFFICE.

VINCENT A. LAPENTA, OF INDIANAPOLIS, INDIANA.

PROCESS FOR MAKING COLLOIDAL ADSORPTION OF HCl.

No Drawing.   Application filed August 17, 1927. Serial No. 213,698.

This invention relates to a process for making a colloidal adsorption product of HCl and is distinguished mainly by the fact that the HCl content is in a free state and that it is introduced by adsorption. This resulting product is neither combined nor salified with a base, but on the contrary the HCl is held in loose chemical and physical combination.

It is an important object of this invention to provide a process for producing a colloidal adsorption product of HCl which will give off HCl in a free state if exposed to any moisture, or if placed in contact with any aqueous liquid.

It is also an important object to provide a method of making a product of this class which contains HCl in a free state, from which all the HCl in it, can be removed by steam distillation. This proves that it is held in the free state, as is also shown by its characteristic reaction to dimethylamino azobenzene. (Toepfer's Reagent.)

It is also an object to provide a process for making a medicinal product of this class which will liberate free HCl in the stomach when taken immediately after a meal. This is very advantageous as the liquid preparation containing HCl in common practice produces irritation of the œsophagus, and a burning sensation in the stomach, and patients have to stop using such medicine before much benefit is derived in the various conditions that require the use of such agents.

This product may be produced as follows:
Prepare in hot water an infusion of agar-agar in proper proportion of about 20 grammes to one liter, subject to autoclave for about 25 minutes at approximately 30 pd. of steam pressure and filter it while hot thru asbestos wool. This is conveniently carried out by first placing water in a clean vessel and then adding agar-agar. Allow the agar-agar to imbibe the water and after substantially one hour, place in autoclave. This solution is then filtered thru asbestos wool, as understood by those familiar with the art. Before cooling, and before solution has been set to jell, add about 250 c. c. of HCl and then pour the mixture into a large agate or stone vessel, combining it by stirring with enough kieselguhr or purified siliceous earth, containing approximately 5% tribasic calcium phosphate to produce a thick paste. This is allowed to dry and the resulting cake formation is then reduced to a powder by grinding or otherwise pulverizing. The free HCl content may then be readily determined by taking 1 g. of this powder and placing it in 250 c. c. of N/10 NaOH:

After one half hour of such extraction, the resulting solution is filtered and titrated with N/10 HCl. The amount of HCl present is ascertained by subtracting the amount of N/10 HCl solution used from the 250 of N/10 NaOH solution used in extracting. The resulting difference being equal to the amount of NaOH solution neutralized by HCl when liberated from the product as aforementioned.

It is obvious from the foregoing that I have provided a colloidal adsorption product of HCl from which the HCl may be separated by distillation and which may be further proven to be in a free state by its characteristic reaction to dimethylamino azobenzene (Toepfer's Reagent.)

I claim as my invention:

1. The method of preparing an infusion of agar-agar; subjecting same to autoclave under steam pressure; filtering while still warm, then adding HCl; then combining it with purified siliceous earth, containing tribasic calcium phosphate; allowing to dry and reducing to powder.

2. The method of preparing in hot water an infusion of agar-agar; subjecting same to autoclave under steam pressure, and filtering while still warm; then adding 250 c. c. of HCl; then combining it with kieselguhr or purified siliceous earth, containing tribasic calcium phosphate, allowing to dry, then placing same at 250 c. c. of N/10 NaOH; and filtering and titrating the resulting solution with N/10 HCl.

3. The method of preparing in hot water an infusion of agar-agar in proportion of about 20 grammes to one liter; subjecting same to autoclave for about 25 minutes at approximately 30 pounds of steam pressure and filtering while still warm thru asbestos wool; and before the solution has set to jell; adding substantially 250 c. c. of HCl, and then combining it by stirring with enough kieselguhr or purified siliceous earth, containing about 5% tribasic calcium phosphate to produce a thick paste; allowing to dry and reducing the resulting cake formation to a powder, determining the free HCl content by taking 1 g. of this powder and placing it at approximately 250 c. c. of N/10 NaOH, filtering and titrating the resulting solution with N/10 HCl.

4. The method of preparing an infusion of agar-agar; subjecting same to autoclave under heat and pressure; adding HCl and then combining it with siliceous earth.

5. The method of preparing an infusion of agar-agar; subjecting same to autoclave under steam pressure; filtering, then adding HCl; then combining it with siliceous earth, containing tribasic calcium phosphate.

6. The method of preparing an infusion of agar-agar; subjecting same to autoclave under steam pressure; filtering, then adding HCl; then combining it with siliceous earth, containing tribasic calcium phosphate; and filtering and titrating the resulting solution with N/10 HCl.

In testimony whereof, I have hereunto set my hand on this the 12th day of August, 1927.

VINCENT A. LAPENTA, M. D.